United States Patent [19]

Retter

[11] Patent Number: 5,012,441
[45] Date of Patent: Apr. 30, 1991

[54] APPARATUS FOR ADDRESSING MEMORY WITH DATA WORD AND DATA BLOCK REVERSAL CAPABILITY

[75] Inventor: Refael Retter, Haifa, Israel

[73] Assignee: Zoran Corporation, Santa Clara, Calif.

[21] Appl. No.: 933,815

[22] Filed: Nov. 24, 1986

[51] Int. Cl.$^5$ .................. G06F 12/02; G06F 7/544
[52] U.S. Cl. .................. 364/900; 364/937.8; 364/942.7; 364/951.1; 364/726
[58] Field of Search ... 364/200 MS File, 900 MS File, 364/726; 377/41, 69, 52, 55

[56] References Cited

U.S. PATENT DOCUMENTS

| | | | |
|---|---|---|---|
| 3,731,284 | 5/1973 | Thies | 364/726 |
| 4,117,541 | 9/1978 | Ali | 364/724 |
| 4,138,732 | 2/1979 | Suzuki et al. | 364/900 |
| 4,181,976 | 1/1980 | Collins et al. | 364/900 |
| 4,258,418 | 3/1981 | Heath | 364/200 |
| 4,541,048 | 9/1985 | Propster et al. | 364/200 |
| 4,583,190 | 4/1986 | Salb | 364/726 |
| 4,674,032 | 6/1987 | Michaelson | 364/200 |
| 4,686,483 | 8/1987 | Isshiki et al. | 377/39 |
| 4,720,780 | 1/1988 | Dolecek | 364/200 |

*Primary Examiner*—Thomas C. Lee
*Attorney, Agent, or Firm*—Henry K. Woodward

[57] ABSTRACT

Memory address generation circuitry includes two binary counters for generating addresses for application to an address bus. The least significant bits of one counter are connected to the address bus in bit positions corresponding to the most significant bits of the other counter whereby the two counters increment addresses in opposite directions. The mode of address generation permits addresses for data in normal order, data within data blocks in normal order and data blocks in reverse-bit order, and data within data blocks in bit-reverse order and data blocks in normal order. The circuitry has particular applicability in memory address generation when operating on data with algorithms for FFT operations in one or more dimensions.

3 Claims, 2 Drawing Sheets

APPARATUS FOR ADDRESSING MEMORY WITH DATA WORD AND DATA BLOCK REVERSAL CAPABILITY

BACKGROUND OF THE INVENTION

This invention relates generally to the storage and retrieval of digital data, and more particularly the invention relates to the address of memory whereby data blocks and data words within data blocks can be selectively addressed in normal order or in "bit reversed" or shuffled order for one- and two-dimensional operations.

Zoran Corporation, Assignee of the present application, has introduced a vector signal processor (VSP) designated the ZR34161 whose architecture has been optimized for efficient and rapid computation of digital signal processing operations such as fast Fourier transforms (FFT). As discussed by Rabiner and Gold in *Theory and Application of Digital Signal Processing*, Prentice Hall, 1975, pp. 363-366, most FFT algorithms including the decimation in time algorithm require that the input sequence of numbers be stored in a shuffled order to provide for the output sequence to be in natural order. For example, the required order of an input sequence is X(0), X(4), X(2), X(6), X(1), X(5), X(3), and finally X(7) to obtain a corresponding output sequence in natural order. When N is a power of 2, the input sequence must be stored in a bit-reversed order for the output to be computed in natural order.

The definition of bit-reversed order is if one forms the L bit binary representation of the natural order indices of the input sequence, where $N=2^L$, and reverses the bits, the resulting number is the index of the input sequence that belongs in that position. Thus, in the case of $N=8=2^3$, the natural order indices are shown in the following table at the left side while the bit-reversed indices are shown at the right side:

| Normal Order | | Bit Reversed Order | |
|---|---|---|---|
| Decimal | Binary | Binary Mirror Image | Decimal |
| 0 | 00000 | 00000 | 0 |
| 1 | 00001 | 10000 | 16 |
| 2 | 00010 | 01000 | 8 |
| 3 | 00011 | 11000 | 24 |
| 4 | 00100 | 00100 | 4 |
| 5 | 00101 | 10100 | 20 |
| 6 | 00110 | 01100 | 12 |
| 7 | 00111 | 11100 | 28 |

Thus in order to shuffle the input sequence from its natural to a bit-reversed order, a bit-reversing algorithm is required. One such algorithm is proposed by Rabiner and Gold in which pairs of numbers are interchanged using a temporary storage.

Summary of the Invention

The present invention is directed to the addressing of memories so that data blocks or data words within a block can be accessed in natural order or in a reversed or shuffled order without requiring temporary storage in a manner that will support one-dimensional and two-dimensional operation. Briefly, two address counters are provided which count in opposite directions to provide the natural order address and the bit-reversed order address, respectively. The count of the counters can be divided between a block address and points within a block. A bus is provided for preloading the counters, and a programmed logic array defines the data block size. Mode circuitry establishes the order of addresses within a block and of blocks depending on whether a normal order is required or a bit-reversed order is required and whether the operation is one- or two- dimensional.

The invention and objects and features thereof will be more readily apparent from the following detailed description and appended claims when taken with the drawing in.

DETAILED DESCRIPTION OF ILLUSTRATIVE EMBODIMENT

Figure 1:
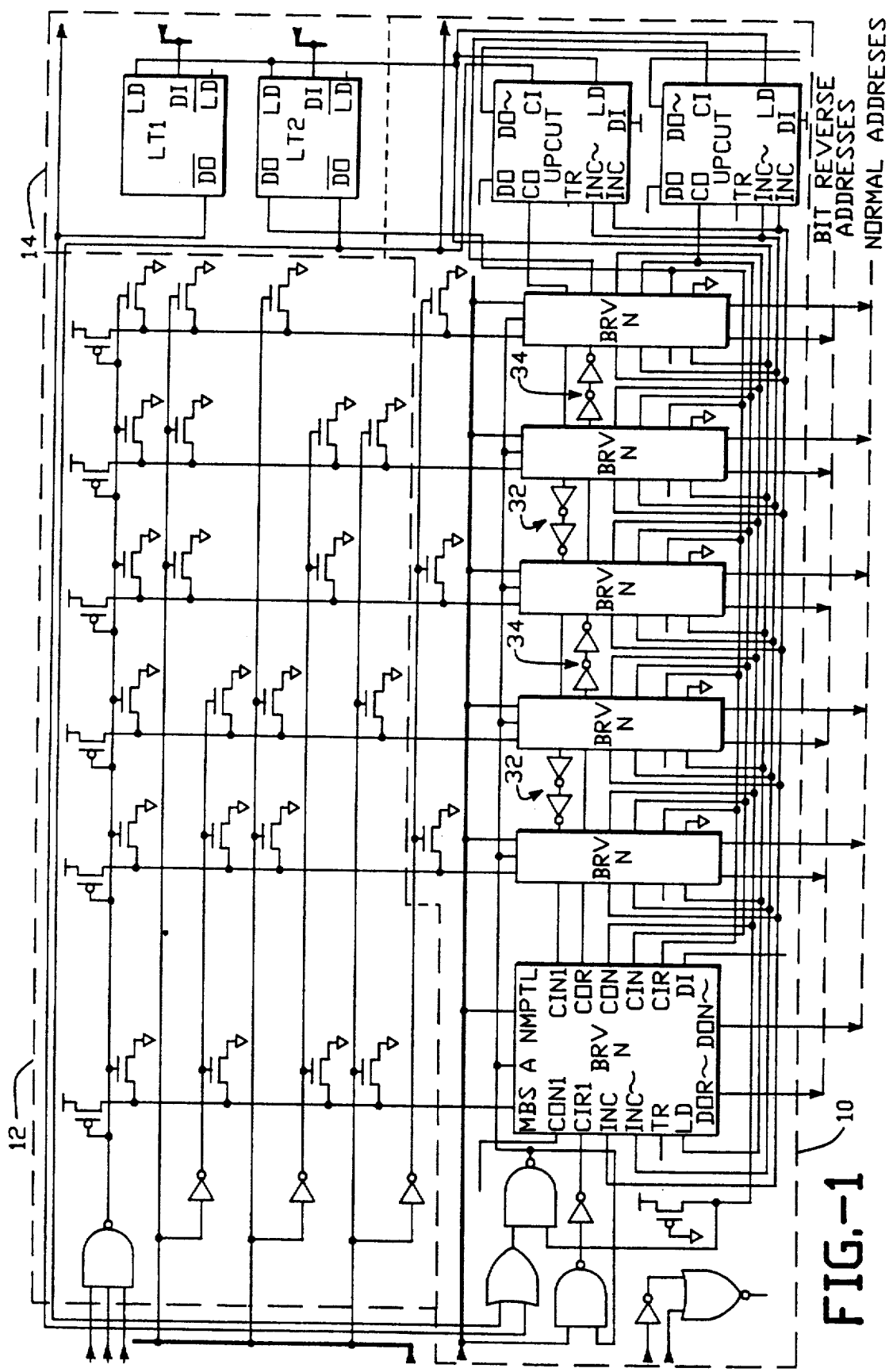
FIG. 1 is a schematic diagram of an address generator in accordance/with the invention.

Referring now to the drawings, FIG. 1 is a schematic diagram of an address generator for use in loading data from external memory to the internal memory of a vector signal processor or for storing data from the internal memory in the external memory. As will be described, the address generator has the capability for establishing a base address; and in response to a mode code, addresses in normal order or in bit-reversed order are generated. The address counter can count points within a block of addresses or the counter can be segmented into a block counter and a point counter.

Following is a 16 bit Load instruction format:

| 0 | 0 | 0 | 0 | NMPT | | | RS | INTRP | EI |
|---|---|---|---|---|---|---|---|---|---|
| MBS | MSS | RV | 0 | MDF | ZR | ZP | | | 0 |
| MBA | | | | | | | | | |
| 15 14 13 12 | 11 10 9 8 7 | 6 | 6 5 4 3 | 2 1 0 | | | | | |

In describing the circuitry, the following nomenclature is employed for Load (LD) from external memory to internal memory and Store (ST) from internal memory to external memory.

| | |
|---|---|
| NMPT | Number of points of real, imaginary, or complex data<br>000 0001 - 1 point<br>111 1111 - 127 points<br>000 0000 - 128 points<br>Logical 128 is translated to 0 literal. |
| RS | RAM Section number<br>0 - section 0 - VSP RAM addresses 0 to 63<br>1 - section 1 - VSP RAM addresses 64 to 127<br>This parameter is used with the NMS parameter in the mode register to pipeline instructions. If an ALU instruction operates with RS = 0, a memory instruction with RS = 1 can operate in parallel with the ALU instruction. |
| INTRP | Interpolation: the number of zeros to be added after each data point read from external memory<br>00 - no zeros added<br>01 - 1 zero added - NMPT must be even<br>10 - 2 zeros added - NMPT must be divisible by 3<br>11 - 3 zeros added - NMPT must be divisible by 4<br>NMPT includes the zeros to be added. If zero padding ZP = 1, the constraints on NMPT above do not apply. If the data is complex, a real zero and an imaginary zero are added for each zero shown by INTRP. |
| EI | Enable Interrupt<br>0 - no interrupt - only the status bit will be set<br>1 - interrupt generated at end of instruction execution |
| MBS | Memory Block Size: number of real, imaginary, or |

| | -continued |
|---|---|
| | complex data points to be loaded before a skip occurs. See also RV below. MDF below selects whether MBS (and MSS) refer to single nodes or complex pairs.<br>000 - 1 point<br>111 - 128 points<br>Logical 2 N is translated to N literal. |
| MSS | Memory Step Size: the total number of points skipped between blocks (this total includes the Memory Block Size).<br>000 - 2 points<br>111 - 256 points<br>Logical 2 (N+1) is translated to N literal.<br>If no skipping is desired MBS should be set to 128. |
| RV | Reverse: order of data after being loaded into VSP internal RAM<br>00 - data in normal order<br>01 - bit reverse order one level<br>10 - data within blocks of size MBS in normal order, blocks in bit-reverse order<br>blocks in bit-reverse order<br>11 - data within blocks of size MBS in bit-reverse order, blocks in normal order.<br>If RV = 01 or 10, NMPT must be a power of 2.<br>If RV = 10 or 11, MBS is used for both memory segmentation and reversing. Use caution. If you use RV for reversing only, set MSS = MBS - 1. |
| MDF | Memory Data Format for VSP internal RAM<br>00 - not used<br>01 - imaginary only<br>10 - real only<br>11 - complex, first part real, second part imaginary |
| ZR | Zero Fill: used to fill a specified block of VSP internal RAM with zeros. One of the two MDF bits must be zero to indicate which part of the data, real or imaginary, will be filled.<br>0 - internal memory unaffected<br>1 with MDF = 01 - imaginary part filled with zeros<br>1 with MDF = 10 - real part filled with zeros |
| ZP | Zero Padding - determine whether the vector read from external memory is half of NMPT and the rest of the values loaded are zeros, or the whole vector read from external memory. If NMPT is odd, the first half read from memory will be larger.<br>0 - no zeros added.<br>1 - NMPT/2 OR (NMPT) + 1)/2 points from memory, the rest zeros |
| MBA | Memory Base Address: the starting address of the data in external memory. |

Referring now to FIG. 1, the address generator comprises bidirectional counter circuitry shown generally at 10, a programmed logic array 12 for establishing block size and block address, and a mode circuitry 14 for generating a two bit code indicative of the mode of operation of the address generator, see RV definition, supra.

Figure 2:
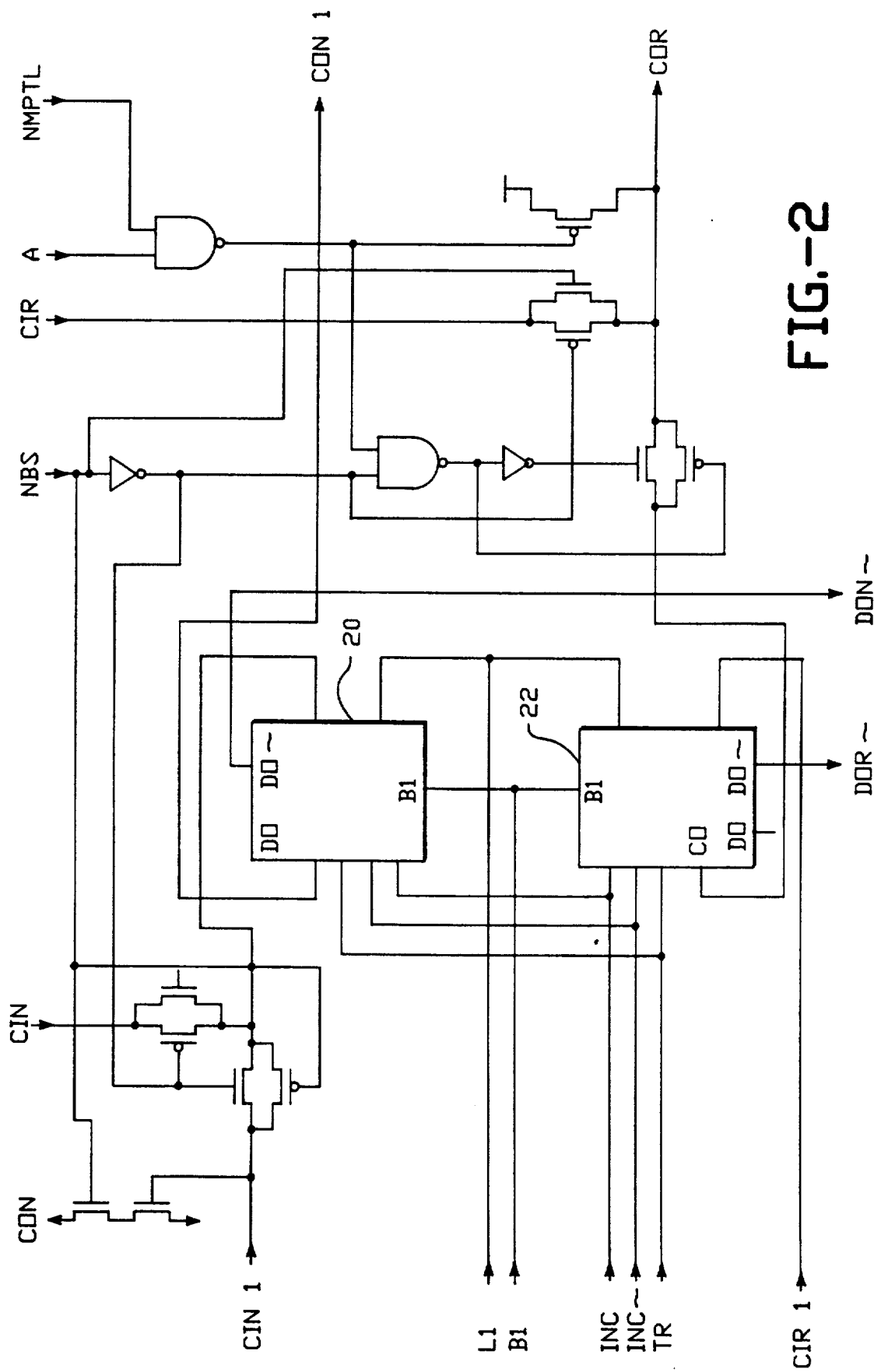
FIG. 2 is a schematic diagram of a counter cell for use in the address generator of FIG. 1.

FIG. 2 is a schematic diagram of one cell in the bidirectional counter of FIG. 1. A first binary counter 20 counts in the normal or natural addressing scheme, and a second binary counter 22 counts in the bit-reversed scheme. Each counter has a carry input $C_i$, a carry output $C_o$, and address bit output (DON for counter 20 and DOR for counter 22). Logic circuitry is provided to respond to an MBS signal from the PLA which determines where to split the counters between block address and point address, external circuit signals for controlling data flow designated CIR and A, and an input for NMPTL for the number of points total in the block.

Referring again to FIG. 1, bus 30 is provided for preloading the counters with the number of points to be transferred. The normal count is serially transmitted through the binary counting cells with amplifiers 32 provided between alternate pairs of cells. Similarly, the bit-reversed count is serially transmitted through the binary counting cells with amplifiers 34 provided between alternate pairs of cells. The addresses as taken from cells are noted.

Bit-reverse address generation circuitry in accordance with the invention facilitates memory address generation when operating on data with algorithms for FFT operations. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. Memory addressing circuitry comprising:
    a first binary counter comprising a plurality of serially connected binary cells,
    a second binary counter comprising a plurality of serially connected binary cells,
    a first bus for loading a count into said first and second binary counters,
    an address bus for receiving count from said first and second counters, said binary cells of said counters being connected to said address bus whereby the least significant bits of one counter correspond to the most significant bits of the other counter whereby addresses from said two counters increment in opposite directions, and address mode means for controlling the application of addresses from said first and second binary counters to said address bus.

2. The circuitry as defined by claim 1 wherein addresses from said counters can include a data block address and a data word address within a data block, said address mode means controlling addresses to said address bus to represent data in normal order, data within blocks in normal order and data blocks in bit-reverse order, and data within blocks in bit-reverse order and blocks in normal order.

3. The circuitry as defined by claim 2 wherein said address mode means include a programmed logic array for controlling block address and data word address generation from said first and second binary counters.

* * * * *